(12) United States Patent
Jang

(10) Patent No.: US 9,014,548 B2
(45) Date of Patent: Apr. 21, 2015

(54) COOLING-WATER HEATING TYPE HEATER

(71) Applicant: Halla Climate Control Corp., Daejeon (KR)

(72) Inventor: Kil Sang Jang, Daejeon (KR)

(73) Assignee: Halla Visteon Climate Control Corporation, Daejeon (KR)

( * ) Notice: Subject to any disclaimer, the term of this patent is extended or adjusted under 35 U.S.C. 154(b) by 103 days.

(21) Appl. No.: 13/778,930

(22) Filed: Feb. 27, 2013

(65) Prior Publication Data

US 2013/0223825 A1 Aug. 29, 2013

(30) Foreign Application Priority Data

Feb. 29, 2012 (KR) .......................... 10-2012-0020998

(51) Int. Cl.
| | | |
|---|---|---|
| *F24H 1/10* | (2006.01) | |
| *F24H 1/00* | (2006.01) | |
| *F24H 1/12* | (2006.01) | |
| *B60H 1/22* | (2006.01) | |
| *H05B 3/42* | (2006.01) | |

(52) U.S. Cl.
CPC .............. *F24H 1/0018* (2013.01); *F24H 1/009* (2013.01); *F24H 1/121* (2013.01); *B60H 1/2221* (2013.01); *B60H 2001/2278* (2013.01); *H05B 3/42* (2013.01)

(58) Field of Classification Search
None
See application file for complete search history.

(56) References Cited

U.S. PATENT DOCUMENTS

| | | | | |
|---|---|---|---|---|
| 1,136,365 A | * | 4/1915 | Quinlan | 92/473 |
| 1,519,395 A | * | 12/1924 | Clench | 392/493 |
| 1,543,012 A | * | 6/1925 | Klimis | 392/493 |
| 1,766,068 A | * | 6/1930 | De Lannoy | 392/493 |
| 1,767,122 A | * | 6/1930 | Dean | 392/492 |
| 1,805,885 A | * | 5/1931 | Rinderspacher et al. | 392/493 |
| 1,831,971 A | * | 11/1931 | Sandstrom | 165/160 |
| 1,985,830 A | * | 12/1934 | Hynes | 392/492 |
| 2,033,443 A | * | 3/1936 | Moses | 392/492 |
| 2,228,004 A | * | 1/1941 | Ewing | 392/489 |
| 2,775,683 A | * | 12/1956 | Kleist | 392/398 |
| 2,797,297 A | * | 6/1957 | Nihlen | 392/492 |
| 3,109,912 A | * | 11/1963 | Cerulli | 392/493 |
| 3,350,915 A | * | 11/1967 | Staffin | 374/3 |
| 3,353,000 A | * | 11/1967 | Tomlinson | 392/492 |
| 3,943,330 A | * | 3/1976 | Pollock et al. | 392/387 |
| 4,286,140 A | * | 8/1981 | Dewulf et al. | 392/493 |
| 4,395,618 A | * | 7/1983 | Cunningham | 392/492 |
| 4,563,571 A | * | 1/1986 | Koga et al. | 392/493 |
| 5,271,086 A | * | 12/1993 | Kamiyama et al. | 392/483 |
| 5,400,432 A | * | 3/1995 | Kager et al. | 392/492 |
| 5,872,890 A | * | 2/1999 | LaCombe | 392/487 |
| 5,930,458 A | * | 7/1999 | Yane et al. | 392/482 |
| 7,158,718 B2 | * | 1/2007 | Russegger | 392/488 |
| 7,756,404 B2 | * | 7/2010 | Schubert et al. | 392/478 |

FOREIGN PATENT DOCUMENTS

| | | |
|---|---|---|
| JP | 2008-056044 A | 3/2008 |
| KR | 1020080023362 | 3/2008 |

OTHER PUBLICATIONS

Notice of Allowance for corresponding Korean Application No. 10-2012-0020998, dated Feb. 25, 2014.

* cited by examiner

*Primary Examiner* — Thor Campbell
(74) *Attorney, Agent, or Firm* — Lowe Hauptman & Ham, LLP

(57) ABSTRACT

Provided is a cooling-water heating type heater, and more particularly, a cooling-water heating type heater capable of effectively heating cooling-water, using a first pipe with a cylindrical first heating part and a second pipe with a second heating part.

16 Claims, 10 Drawing Sheets

Prior art

COOLING-WATER HEATING TYPE HEATER

CROSS-REFERENCE TO RELATED APPLICATIONS

This application claims priority under 35 U.S.C. §119 to Korean Patent Application No. 10-2012-0020998, filed on Feb. 29, 2012 in the Korean Intellectual Property Office, the disclosure of which is incorporated herein by reference in its entirety.

TECHNICAL FIELD

The following disclosure relates to a cooling-water heating type heater, and more particularly, to a cooling-water heating type heater capable of effectively heating cooling-water, using a first pipe with a cylindrical first heating part and a second pipe with a second heating part.

BACKGROUND

The present invention relates to a cooling-water heating type heater, and more particularly, to a cooling-water heating type heater that heats cooling-water for heating the interior of a vehicle.

The most typical vehicles are vehicles with an engine as a driving source using gasoline, light oil and the like as energy sources at present, but it is increasingly necessary to find a new energy source for the vehicle using the energy sources too due to various causes such as environmental pollution and reduction of oil reserves, and currently, a vehicle using fuel cells for an energy source is one of the technologies closest to practical use.

The vehicle using fuel cells, however, cannot use a heating system using cooling water, unlike the vehicles with engines using oil as an energy source in the related art. That is, in the vehicles with an engine as a driving source using oil as an energy source in the related art, the engine generates a large amount of heat and a cooling-water circulation system for cooling the engine is mounted, and the heat that the cooling water takes from the engine is used for heating the interior of the vehicles. However, there is a limit in using the heating system for the vehicles using fuel cells, because their driving sources do not generate as much heat as the engine.

Therefore, various studies have been conducted for the vehicles using fuel cells, such as adding a heat pump to the air-conditioning system to use the heat pump as a heat source or mounting a specific heat source such as an electric heater. In the studies, the electric heater is used at present over a wide range, because it can more easily heat cooling water without a large influence on the air-conditioning system.

FIG. 1 shows Japanese Patent Laid-Open Publication No. 2008-056044 ("apparatus for heating heat carrier and air-conditioning system for vehicle using the same", 2008.03.13), which is one of cooling-water heating type heaters of the related art.

The cooling-water heating type heater disclosed in Japanese Patent Laid-Open Publication No. 2008-056044 has a structure that more effectively heats cooling-water by increasing heat transfer efficiency from a PTC electrode plate that is a heating source to the cooling water, by disposing plate-shaped fins on the top and bottom of the PTC electrode plate such that the cooling water passes the plate-shaped fins.

The cooling-water heating type heater, however, has a problem in that it is difficult to achieve a sufficient effect of heating the cooling-water, and other problems including the problem are described below.

First, there is a problem in that since the heating source (PTC electrode plate) is added as a separate part, the number of parts increases and the volume and weight also increase. Second, the heat generated from the PTC electrode plate fails to fully transfer to the cooling water and some of the heat transfers to the outside, resulting in heat loss. Third, since there are various objects on an insulating layer on the heat transfer path from the PTC electrode plate to the cooling water, thermal resistance increases and heat transfer efficiency correspondingly decreases. Fourth, the design, including the cooling-water pipe lines or electric wire circuit, is complicated, when the cooling-water heating type heater is mounted on a vehicle, and the cooling-water heating type heater is difficult to mount, because the volume is large.

That is, it is required to develop a cooling-water heating type heater capable of effectively heating cooing-water and being easily manufactured and mounted while reducing the volume, weight, and cost.

PRIOR ART DOCUMENT

Patent Document

Japanese Patent Laid-Open Publication No. 2008-056044 ("Apparatus for heating heat carrier and air-conditioning system for vehicle using the same", 2008.03.13)

SUMMARY

The present invention has been made in an effort to solve the problems and an object of the present invention is to provide a cooling-water heating type heater capable of effectively heating cooling-water, using a first pipe with a cylindrical first heating part and a second pipe with a second heating part.

An embodiment of the present invention is directed to providing a cooling-water heating type heater that can quickly and effectively heat cooling-water by heating cooling-water that has flown inside through an inlet while it flows through a first pipe (first heating area), heating the cooling-water while it flows through between the first pipe and a second pipe (second heating area), and heating the cooling-water while it flows through between the second pipe and a case (third heating area).

Another embodiment of the present invention is directed to providing a cooling-water heating type heater that can be easily manufactured and include a coating layer with a carbon nanotube heating layer and a protection pipe in a first heating part and a second heating part, and of which the durability can be secured, even if cooling-water comes in direct contact with the heater.

Another embodiment of the present invention is directed to providing a cooling-water heating type heater that of which the components and the assembly process can be simplified and the productivity can be increased, by integrally forming an inlet, a first pipe, and a first cover and integrally forming a second pipe and a second cover.

Another embodiment of the present invention is directed to providing a cooling-water heater type heater that can have improved durability by further including a first support body that supports the second pipe on the outer side of the first pipe and a second support body that supports the case on the outer side of the second pipe, that can be easily controlled by operating an anti-temperature part and a controller together, and that can have improved safety by operating an anti-overheating part independently from the operation of the controller.

In one general aspect, there is provided a cooling-water heating type heater for heating an interior, including: a case that defines a predetermined space therein, has an intake port through which cooling-water flows inside on one longitudinal end and a discharge port through which the cooling water is discharged, on the circumferential surface; a first pipe that communicates with the intake port in the case, is spaced from the inner side of the other end of the case, and has a first heating part generating heats in a longitudinally predetermined section; a second pipe that extends from the inner side of the other end of the case, is larger in diameter than the first pipe to surround the a predetermined section of the first pipe, is spaced from the inner side of one end of the case, and has a second heating part generating heat in a longitudinally predetermined section; and a controller that controls operations of the first heating part of the first pipe and the second heating part of the second pipe.

Cooling-water flowing inside through the intake port may be discharged through the discharge port, sequentially through a first heating area where the cooling-water is heated while it flows through the first pipe, a second heating area where the cooling water that has passed the first heating area and returned at the other end of the case is heated while it flows through between the first pipe and the second pipe, and a third heating area where the cooling-water that has passed the second heating area and returned at one end of the case is heated while it flows through between the second pipe and the case.

The first heating part may include: a first coating layer including a first insulating layer formed in a predetermine section on the first pipe, a pair of first electrodes longitudinally extending on the upper side of the first insulating layer, a first carbon nanotube heating layer formed on the upper side of the first insulating layer in electric connection with the first electrodes, and a first protection layer covering the first electrodes and the first carbon nanotube heating layer on the upper side of the first insulating layer; and a first protection pipe being in close contact with the first coating layer, with an end welded to the first pipe, and the second heating part includes: a second coating layer including a second insulating layer formed in a predetermined section on the second pipe, a pair of second electrodes longitudinally extending on the upper side of the second insulating layer, a second carbon nanotube heating layer formed on the upper side of the second insulating layer in electrical connection with the second electrodes, and a second protection layer covering the second electrodes and the second carbon nanotube heating layer, on the upper side of the second insulating layer; and a second protection pipe being in close contact with the second coating layer, with an end welded to the second pipe.

The first heating part and the second heating part may further include a first insulating film and a second insulating film, respectively, around the first coating layer and the second coating layer, respectively.

The cooling-water heating type heater may further include heat dissipating fins around the first pipe and the second pipe.

Both ends of the case may be closed by a first cover integrally formed with the intake port and the first pipe and a second cover integrally formed with the second pipe, respectively.

The cooling-water heating type heater may further include: a first support body that supports the first pipe and the second pipe therebetween at the other side of the first pipe; and a second support body that supports the second pipe and the case therebetween at one side of the second pipe.

The first support body may include a 1-1 cylindrical member being in close contact with the outer side of the first pipe, a 1-2 cylindrical member being in close contact with the inner side of the second pipe, and two or more first connecting portions connecting the 1-1 cylindrical member with the 1-2 cylindrical member, while the second support body includes a 2-1 cylindrical member being in close contact with the outer side of the second pipe, a 2-2 cylindrical member being in close contact with the inner side of the case, and two or more second connecting portions connecting the 2-1 cylindrical member with the 2-2 cylindrical member.

The cooling-water heating type heater may further include a temperature sensor, in which the controller controls the operations of the first heating part and the second heating part, using the information sensed by the temperature sensor.

The temperature sensor may be disposed close to the discharge port of the case.

The cooling-water heating type heater may further include an anti-overheating part that shuts off power supplied to the first heating part and the second heating part, when the cooling-water increases in temperature to a reference temperature or more.

A space forming a predetermined space on the second cover may be formed on the outer side corresponding to the area where the second pipe is formed, and the anti-overheating part may be disposed in the space of the second cover.

The anti-overheating part may include: a bimetal connected with a power line carrying power to the first heating part and the second heating part; a bracket holding one end of the bimetal in the space of the second cover; and a terminal carrying power from an external power to the heating layers through the bimetal, in contact with the other end of the bimetal, in which when the temperature of the second cover which corresponds to the temperature of cooling-water increases over the reference temperature, the bimetal deforms such that the other end of the bimetal comes off the terminal, such that the power supplied to the first heating part and the second heating part is shut off.

<Detailed Description of Main Elements>

Figure 1:
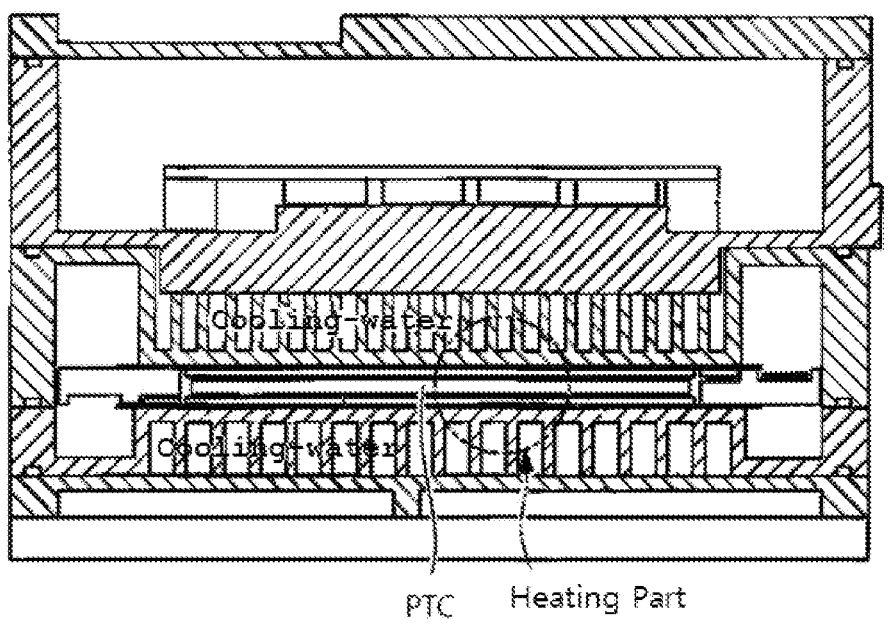
FIG. 1 is a view showing a cooling-water heating type heater of the related art.

1000: Cooling-water heating type heater
100: Case
102: Second cover
110: Intake port
200: First pipe
210: First coating layer
211: First insulating layer
212: First electrode
213: Carbon nanotube heating layer
220: First protection pipe
230: First insulating film
300: Second pipe
310: Second coating layer
311: Second insulating layer
312: Second electrode
313: Second carbon nanotube heating layer
320: Second protection pipe
330: Second insulating film
400: Controller
500: Heat dissipating fin
610: First support body
611: 1-1 cylindrical member
612: 1-2 cylindrical member
613: First connecting portion
620: Second support body
621: 2-1 cylindrical member
622: 2-2 cylindrical member
623: Second connecting portion
700: Temperature sensor
800: Anti-overheating part
810: Bimetal
820: Bracket
A1: First heating area
A2: Second heating area
A3: Third heating area 101: First cover
103: Space
120: Discharge port
200a: First heating part 300a: Second heating part 410: Substrate 830: Terminal

DETAILED DESCRIPTION OF EMBODIMENTS

Hereinafter, a heater 1000 for a vehicle of the present invention which has the features described above will be described in detail with reference to the accompanying drawings.

A cooling-water heating type heater 1000 of the present invention, a device that heats cooling-water to heat an interior, includes a case 100, a first pipe 200, a third pipe 300, and a controller 400.

The case 100, a basic body constituting the cooling-water heating type heater 1000 of the present invention, defines a predetermined space therein.

The case 100 has an intake port 110 through which cooling-water flows inside on one longitudinal end and a discharge port 120 through which the cooling water is discharged, on the circumferential surface, and it is preferable that the discharge port 120 is formed not close to, but sufficiently far from the intake port 110.

The first pipe 200, which is disposed in the case 100 for heating, has a first heating part 200a in a predetermined range, and cooling-water flowing inside and outside the first pipe 200 is heated by the first heating part 200a.

The first pipe 200 communicates with the intake port 110 and may be a tubular part. Further, the first pipe 200 is spaced with a gap from the inner side of the other end (opposite the side where the intake port 110 is formed) of the case 100, such that the cooling-water flowing inside through the intake port 110 flows through the first pipe 200 from the intake port 110 to the opposite side and then flows to the outside of the first pipe 200 through the gap.

The second pipe 300 extends from the inner side of the other end of the case 100, with a large in diameter than the first pipe 200, includes a predetermined section of the first pipe 200, and has a second heating part 300a that heats cooling-water. The second pipe 300 may be a tubular part.

The second pipe 300 is spaced with a gap from the inner side of one end (the side where the intake port 110 is formed) of the case 100, such that the cooling-water flowing through between the first pipe 200 and the second pipe 300 flows to the outside of the second pipe 300 (between the second pipe 300 and the case 100) through the gap.

The controller 400, which controls the operations of the first heating part 200a and the second heating part 300a, may include a substrate 410 and wires.

Figure 2:
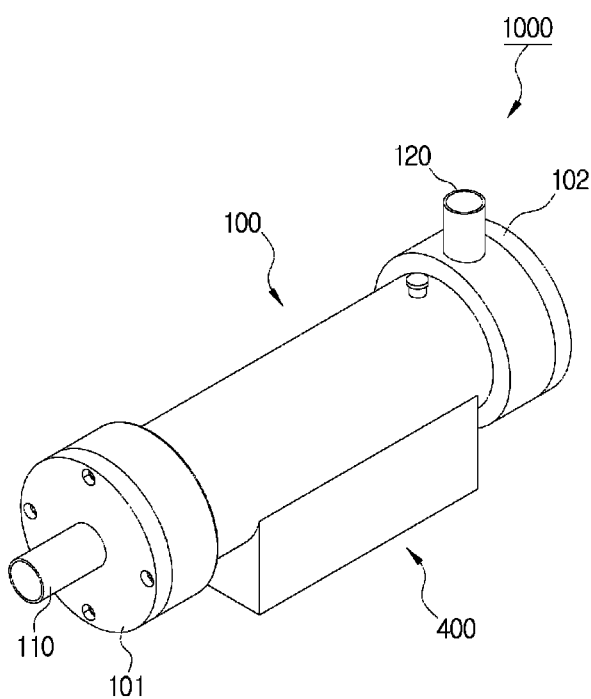
FIGS. 2 to 5 are a perspective view, an exploded perspective view, and a cross-sectional view which show a cooling-water heating type heater according to the present invention, and a schematic view showing the flow of cooling-water, respectively.
Figure 3:
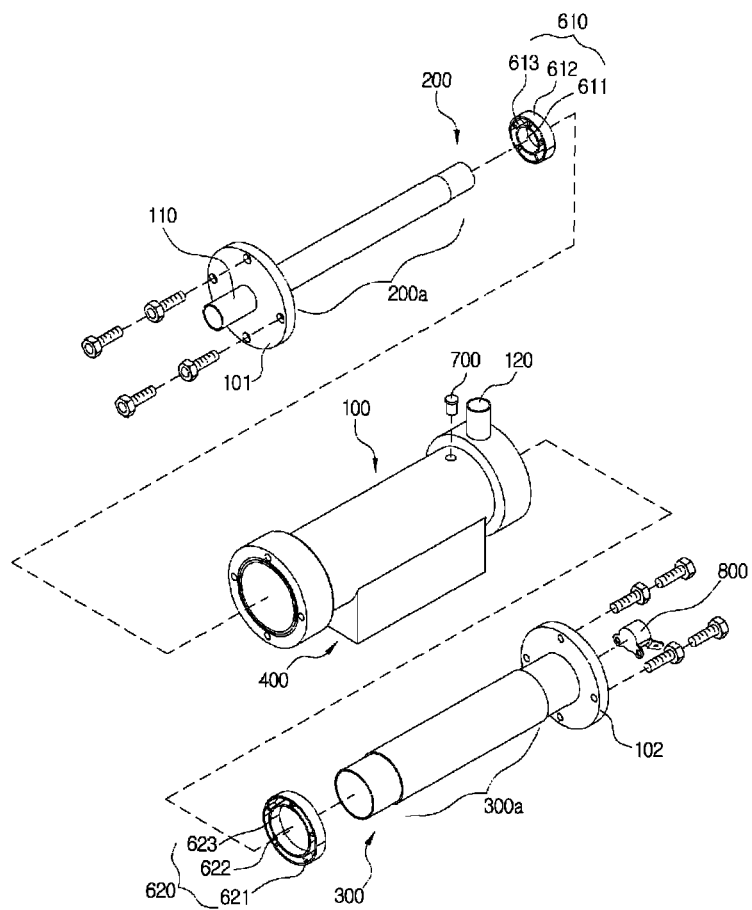
Figure 4:
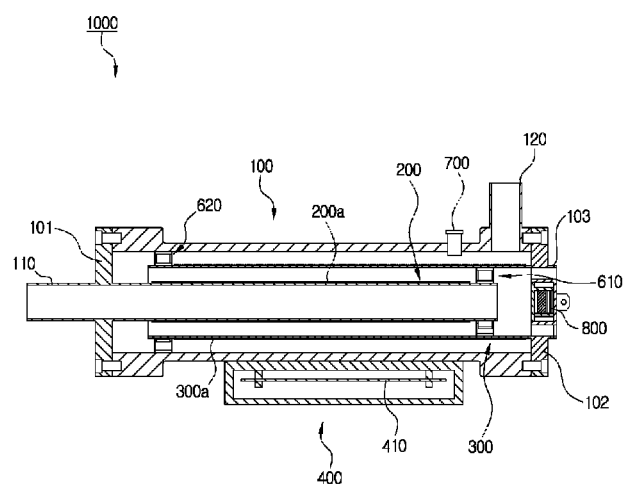

In FIGS. 2 to 4, the controller 400 has a flat bottom, supporting a portion of the circumference of the case 100 and the heater may be fixed a separate part through the controller 400.

In the cooling-water heating type heater 1000 of the present invention, the controller 400 is not limited to the shape described above and may be implemented in various ways.

Further, the cooling-water heating type heater 1000 of the present invention further includes a temperature sensor 700 and the controller 400 can control the operations of the first heating part 200a and the second heating part 300a, using the information sensed by the temperature sensor 700.

It is preferable that the temperature sensor 700 is disposed close to the discharge port 120 of the case 100 where the temperature of the cooling-water is the highest.

The controller 400 can control the operation of the first heating part 200a and the second heating part 300a, using not only the information sensed by the temperature sensor 700, but the status of a vehicle which includes the temperature of cooling-water before flowing into the cooling-water heating type heater 1000 and the air-conditioning status set by a passenger.

Figure 5:
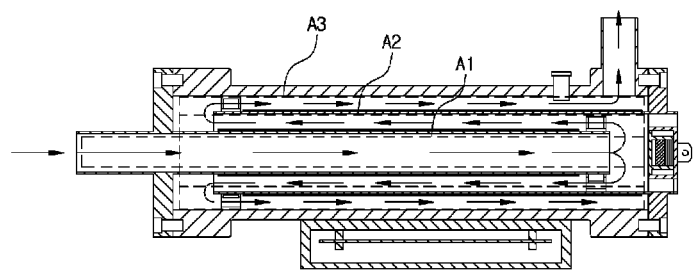

The flow of cooling-water in the cooling-water heating type heater 1000 according to the present invention is described in detail. Cooling-water flowing inside through the intake port 110 is discharged through the discharge port 120, sequentially through a first heating area A1 where the cooling-water is heated while it flows through the first pipe 200, a second heating area A2 where the cooling water that has passed the first heating area A1 and returned at the other end of the case 100 is heated while it flows through between the first pipe 200 and the second pipe 300, and a third heating area A3 where the cooling-water that has passed the second heating area A2 and returned at one end of the case 100 is heated while it flows through between the second pipe 300 and the case 100 (See FIG. 5).

That is, the cooling-water heating type heater 1000 of the present invention can achieve a sufficient heating effect, because the cooling-water is heated throughout the region until it is discharged through the discharge port 120 after flowing into the case 100 through the intake port 110, and particularly, the heater can be useful when there is lack of heating source for heating at the early state of starting an engine, by quickly heating a large amount cooling-water.

The first heating part 200a of the first pipe 200 and the second heating part 300a of the second pipe 300 may be implemented in various ways for heating and are described by means of the example shown in FIGS. 6 to 10.

Figure 6:
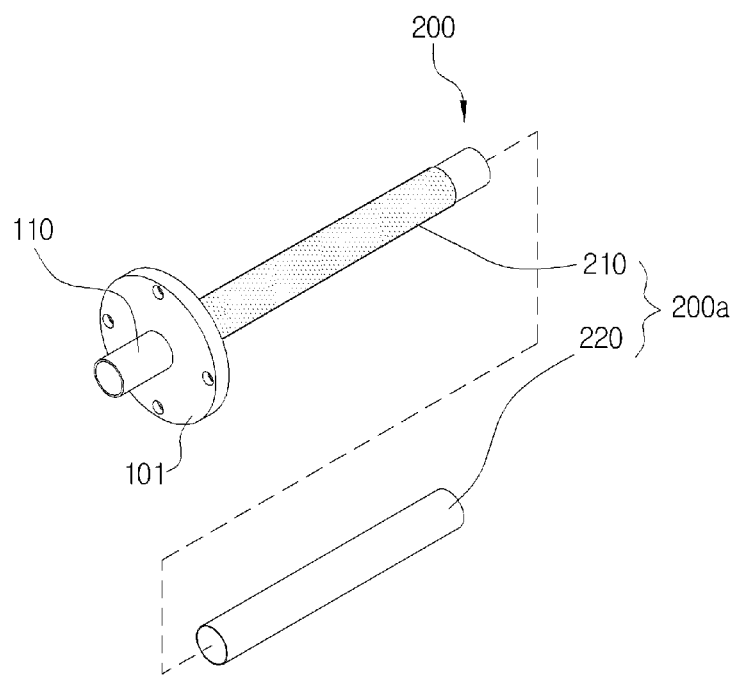
FIGS. 6 to 8 are an exploded perspective view, a partial cut perspective view, and a cross-sectional view, respectively, which show a first pipe of the cooling-water heating type heater according to the present invention.
Figure 7:
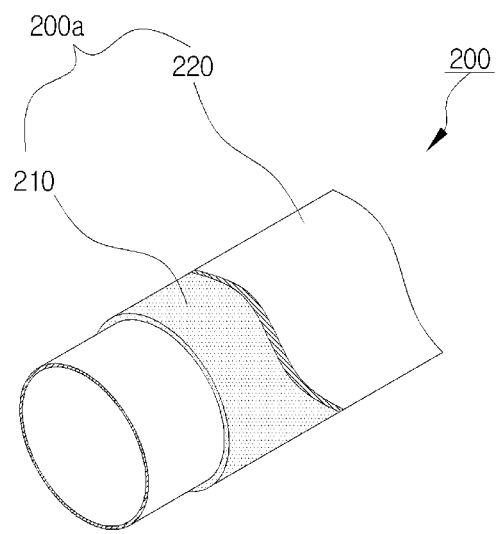
Figure 8:
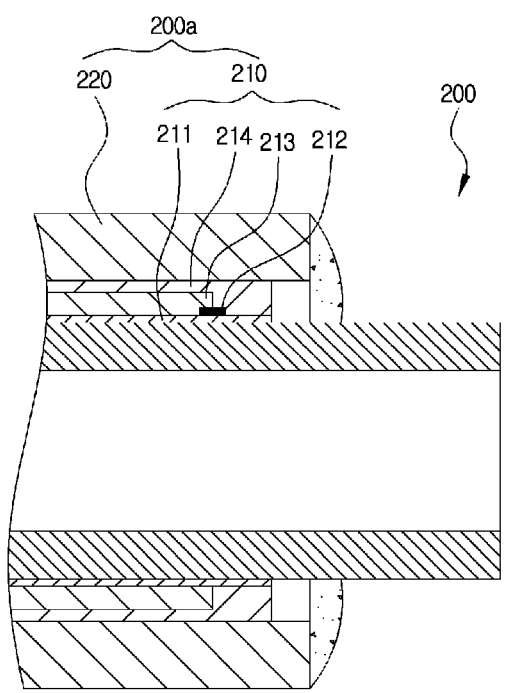

First, FIGS. 6 to 8 show an example of the first heating part 200a, which may include a first coating layer 210 and a first protection pipe 220.

The first coating layer 210 is coated directly on the outer side of the first pipe 200 and includes a first insulating layer 211 formed in a predetermine section on the first pipe 200, a pair of first electrodes 212 longitudinally extending on the upper side of the first insulating layer 211, a first carbon nanotube heating layer 213 formed on the upper side of the first insulating layer 211 in electric connection with the first electrodes 212, and a first protection layer covering the first electrodes 212 and the first carbon nanotube heating layer 213 on the upper side of the first insulating layer 211.

The first protection pipe 220 surrounds the first coating layer 210 in close contact with the first coating layer 210 with both ends welded to the first pipe 200.

That is, the durability of the first pipe 200 can be secured, because the section of the first coating layer 210 generating heat in the first heating part 200a is not exposed to the outside, and the effect of heating cooling-water can be improved by direct thermal conduction to the first protection pipe 220.

Figure 9:
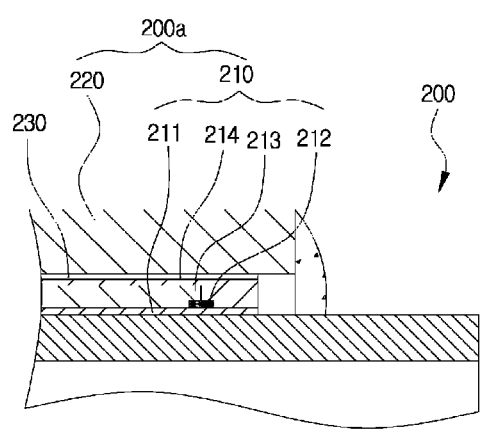
FIG. 9 is another cross-sectional view showing the first pipe of the cooling-water heating type heater according to the present invention.

Further, in the cooling-water heating type heater 1000 of the present invention, as shown in FIG. 9, the first heating part 200a may further include a first insulating film 230 around the first coating layer 210.

That is, the first insulating film 230 may be disposed between the first coating layer 210 and the first protection pipe 220.

Figure 10:
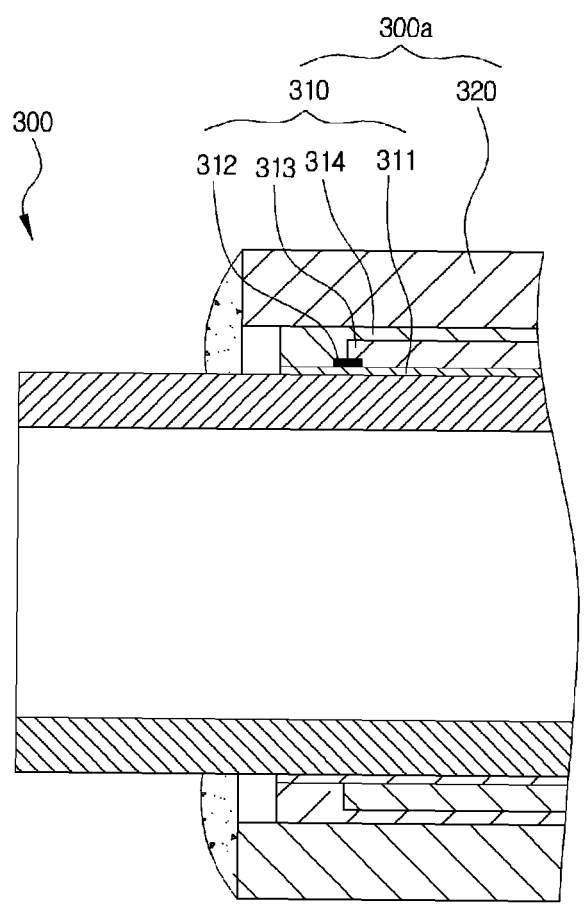
FIG. 10 is a cross-sectional view showing a second pipe of the cooling-water heating type heater according to the present invention.

FIG. 10 shows the second heating part 300a of the second pipe 300 and the second heating part 300a may have a configuration similar to that of the first heating part 200a of the first pipe 200.

In detail, the second pipe 300 may include: a second coating layer 310 including a second insulating layer 311 formed in a predetermined section on the second pipe 300, a pair of second electrodes 312 longitudinally extending on the upper side of the second insulating layer 311, a second carbon nanotube heating layer 313 formed on the upper side of the second insulating layer 311 in electrical connection with the second electrodes 312, and a second protection layer covering the second electrodes 312 and the second carbon nanotube heating layer 313, on the upper side of the second insulating layer 311; and a second protection pipe 320 being in close contact with the second coating layer 310, with an end welded to the second pipe 300.

Further, in the cooling-water heating type heater 1000 of the present invention, the second insulating film 330 may be disposed between the second coating layer 310 and the second protection pipe 320.

Although the reference numeral 330 indicting the second insulating film 300 is not shown in the figures, the second insulating film 330, which is a component corresponding to the first insulating film 230 (indicated by reference numeral 230), may be disposed between the second coating layer 310 and the second protection pipe 320 in FIG. 10.

On the other hand, both ends of the case 100 may be closed by a first cover 101 integrally formed with the inlet port 110 and the first pipe 200 and a second cover 102 integrally formed with the second pipe 300, respectively, in order to keep the cooling-water heating type heater 1000 of the present invention hermetic, simplify the configuration, and make the assembly process easy (See FIG. 3).

That is, the intake port 110 and the first pipe 200 are integrally formed on one side and the other side, respectively, at the center portion of the first cover 101 and the second pipe 300 is integrally formed at the center portion of the second cover 102, such that the entire configuration can be easily assembled, by assembling the case 100, the first cover 101, and the second cover 102 in a rough configuration.

Although FIG. 3 shows that the first cover 101 and the second cover 102 are fastened to the case 100 by separate fasteners, the cooling-water heating type heater 1000 of the present invention is not limited thereto and a sealing member such as an O-ring may be disposed on the contact surfaces between the first cover 101 and the case 100 and between the second cover 102 and the case 100 in order to prevent leakage of the cooling-water in the case 100.

Further, the cooling-water heating type heater 1000 of the present invention may further include a first support body 610 that supports the first pipe 200 and the second pipe 300 therebetween at the other side of the first pipe 200 and a second support body 620 that supports the second pipe 300 and the case 100 therebewteen at one side of the second pipe 300 in order to increase durability, when the case 100, the first pipe 200, and the second pipe 300 increase in length.

The first support body 610 and the second support body 620, which are separate parts, are fitted on the first pipe 200 and the second pipe 300, respectively.

The first support body 610 and the second support body 620 are formed in similar configurations to correspond to the first pipe 200 and the second pipe 300, so that there is a difference in size.

In detail, the first support body 610 includes a 1-1 cylindrical member 611 being in close contact with the outer side of the first pipe 200, a 1-2 cylindrical member being in close contact with the inner side of the second pipe 300, and two or more first connecting portions 613 connecting the 1-1 cylindrical member 611 with the 1-2 cylindrical member 612, while the second support body 620 includes a 2-1 cylindrical member 621 being in close contact with the outer side of the second pipe 300, a 2-2 cylindrical member being in close contact with the inner side of the case 100, and two or more second connecting portions 623 connecting the 2-1 cylindrical member 621 with the 2-2 cylindrical member 622.

The first support body 610 is sized in order not to interfere with the flow of cooling-water between the first pipe 200 and the second pipe 300, stably supporting the 1-1 cylindrical member 611 and the 1-2 cylindrical member 612 by means of the first connecting portions 613, and the second support body 620 is also sized in order not to interfere with the flow of cooling-water between the second pipe 300 and the case 100, stably supporting the 2-1 cylindrical member 621 and the 2-2 cylindrical member 622 by means of the second connecting portions 623.

It is preferable that the first support body 610 and the second support body 620 are disposed on the portion of the first pipe 200 where the first heating part 200a is not formed and on the portion of the second pipe 300 where the second heating part 300a is not formed.

Further, the cooling-water heating type heater 1000 of the present invention may further include an anti-overheating part 800 that shuts off the power supplied to the first heating part 200a and the second heating part 300a, when the cooling-water increases in temperature to a reference temperature or more.

It is preferable that the anti-overheating part 800 is disposed on the outer side of the second cover 102, and particularly, a space 103 forming a predetermined space may be formed on the outer side of the second cover 102 such that the anti-overheating part 800 can be protected when mounted, and the anti-overheating part 800 may be seated in the space 103.

It is preferable that the space 103 is formed in the same area as the second pipe 300 (with the same diameter) to improve the manufacturing performance.

The anti-overheating part 800 is a component that senses temperature independently from the operation of the controller 400 and shuts off the power supplied to the first heating part 200a and the second heating part 300a, when they are overheated at a predetermined temperature or more.

The anti-overheating part 800 may include a bimetal 810, a bracket 820, and a terminal 830, as a detailed example.

The bimetal 810 is connected with a power line carrying power to the first heating part 200a and the second heating part 300a and one end of the bimetal 810 is held in the space 103 of the second cover 102 by the bracket 820.

The terminal 830 is a member that carries power to the heating parts from an external power through the bimetal 810, in contact with the other end of the bimetal 810.

Figure 11:
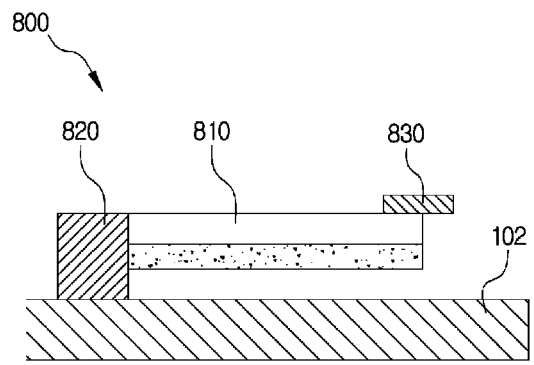
FIGS. 11 and 12 is a view showing the operation of an anti-overheating part of the cooling-water heating type heater according to the present invention.
Figure 12:
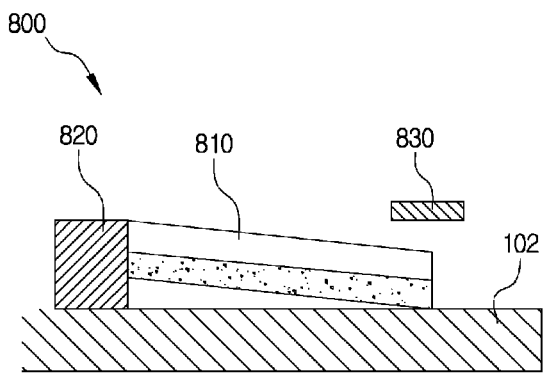

An example of the operation of the anti-overheating part 800 using the bimetal 810 is described in detail with reference to FIG. 11 and FIG. 12. As shown in FIG. 11, when the temperature of the second cover 102 which corresponds to the temperature of cooling-water is under a reference temperature, the bimetal 810 keeps in contact, and as shown in FIG. 12, when the temperature of the second cover 102 which corresponds to the temperature of cooling-water increases over the reference temperature, the bimetal 810 deforms such that the other end of the bimetal 810 comes off the terminal 830, such that the power supplied to the first heating part 200a and the second heating part 300a is shut off.

Therefore, the cooling-water heating type heater 1000 of the present invention has the advantage that the durability can be increased by further including the first support body 610 on the outer side of the first pipe 200 to support the second pipe 300 and the second support body 620 on the outer side of the second pipe 300 to support the case 100, the control is easy operating the anti-temperature part and the controller 400 together, and safety can be improved by operating the anti-overheating part 800 independently from the operation of the controller 400.

Figure 13:
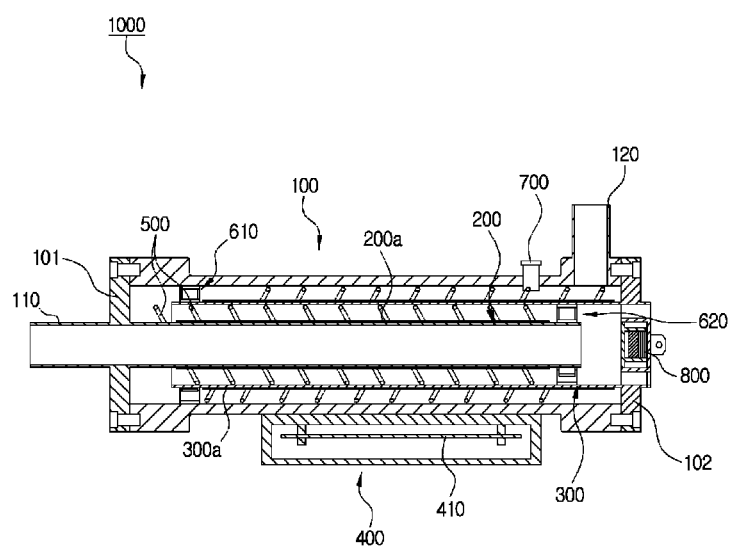
FIG. 13 is an exploded perspective view and a cross-sectional view showing another example of a cooling-water heating type heater according to the present invention.

Further, in order to increase the heat transfer efficiency in the cooling-water heating type heater 1000 of the present invention, heat dissipating fins 500 may be further formed around the first pipe 200 and the second pipe 300, in which it is preferable to spirally arrange the heat dissipating fins 500 (See FIG. 13).

The cooling-water heating type heater 1000 of the present invention has the advantage that it can quickly and effectively heat cooling-water by heating cooling-water that has flown inside through an inlet while it flows through a first pipe 200 (first heating area A1), heating the cooling-water while it flows through between the first pipe200 and a second pipe 300 (second heating area A2), and heating the cooling-water while it flows through between the second pipe 300 and a case 100 (third heating area A3).

Therefore, the cooling-water heating type heater 1000 of the present invention has the advantage that it is possible to secure heating performance by directly heating cooling-water, even it is difficult to secure a heat source of heating in the early stage of starting an engine.

Therefore, the cooling-water heating type heater of the present invention has the advantage that is can effectively heat cooling-water, using a first pipe with a first cylindrical heating part and a second pipe with a second heating part.

In particular, the cooling-water heating type heater of the present invention has the advantage that it can quickly and effectively heat cooling-water by heating cooling-water that has flown inside through an inlet while it flows through a first pipe (first heating area), heating the cooling-water while it flows through between the first pipe and a second pipe (second heating area), and heating the cooling-water while it flows through between the second pipe and a case (third heating area).

Further, the cooling-water heating type heater of the present invention has the advantage that it can be easily manufactured and include a coating layer with a carbon nanotube heating layer and a protection pipe in a first heating part and a second heating part, and of which the durability can be secured, even if cooling-water comes in direct contact with the heater.

Further, the cooling-water heating type heater of the present invention has the advantage that the components and the assembly process can be simplified and the productivity can be increased, by integrally forming an inlet, a first pipe, and a first cover and integrally forming a second pipe and a second cover.

Further, the cooling-water heating type heater of the present invention has the advantage that it can have improved durability by further including a first support body that supports the second pipe on the outer side of the first pipe and a second support body that supports the case on the outer side of the second pipe, that can be easily controlled by operating an anti-temperature part and a controller together, and that can have improved safety by operating an anti-overheating part independently from the operation of the controller.

The present invention is not limited to the embodiments described above, may be used for various fields, and may be modified in various ways without departing from the spirit of the present invention described in claims.

What is claimed is:

1. A cooling-water heating type heater for heating an interior, comprising:
   a case that defines a predetermined space therein, has an intake port through which cooling-water flows inside on one longitudinal end and a discharge port through which the cooling-water is discharged, on the circumferential surface;
   a first pipe that communicates with the intake port in the case, is spaced from an inner side of the other end of the case, and has a first heating part configured to generate heat in a longitudinally predetermined section;
   a second pipe that extends from the inner side of the other end of the case, is larger in diameter than the first pipe to surround the a predetermined section of the first pipe, is spaced from an inner side of the one longitudinal end of the case, and has a second heating part configured to generate heat in a longitudinally predetermined section; and
   a controller configured to control operations of the first heating part of the first pipe and the second heating part of the second pipe,
   wherein
   the first heating part includes:
      a first coating layer including a first insulating layer in a predetermined section on the first pipe, a pair of first electrodes longitudinally extending on an upper side of the first insulating layer, a first heating layer on the upper side of the first insulating layer in electric connection with the first electrodes, and a first protection layer covering the first electrodes and the first heating layer on the upper side of the first insulating layer; and
      a first protection pipe, being in close contact with the first coating layer, with an end connected to the first pipe, and
   the second heating part includes:
      a second coating layer including a second insulating layer in a predetermined section on the second pipe, a pair of second electrodes longitudinally extending on an upper side of the second insulating layer, a second heating layer on the upper side of the second insulating layer in electrical connection with the second electrodes, and a second protection layer covering the second electrodes and the second heating layer, on the upper side of the second insulating layer; and a second protection pipe, being in close contact with the second coating layer, with an end connected to the second pipe.

2. The cooling-water heating type heater of claim 1, wherein cooling-water flowing inside through the intake port is discharged through the discharge port, sequentially through a first heating area where the cooling-water is heated while flowing through the first pipe, a second heating area where the cooling-water that has passed the first heating area and returned at the other end of the case is heated while flowing through between the first pipe and the second pipe, and a third heating area where the cooling-water that has passed the second heating area and returned at the one end of the case is heated while it flowing through between the second pipe and the case.

3. The cooling-water heating type heater of claim 1, wherein the first heating part and the second heating part further include a first insulating film and a second insulating film, respectively, around the first coating layer and the second coating layer, respectively.

4. The cooling-water heating type heater of claim 1, further comprising heat dissipating fins around the first pipe and the second pipe.

5. The cooling-water heating type heater of claim 1, wherein both ends of the case are closed by a first cover integrally formed with the intake port and the first pipe and a second cover integrally formed with the second pipe, respectively.

6. The cooling-water heating type heater of claim 5, further comprising:
a first support body that supports the first pipe and the second pipe therebetween at the other side of the first pipe; and
a second support body that supports the second pipe and the case therebetween at one side of the second pipe.

7. The cooling-water heating type heater of claim 6, wherein the first support body includes a 1-1 cylindrical member being in close contact with an outer side of the first pipe, a 1-2 cylindrical member being in close contact with an inner side of the second pipe, and two or more first connecting portions connecting the 1-1 cylindrical member with the 1-2 cylindrical member, and
the second support body includes a 2-1 cylindrical member being in close contact with an outer side of the second pipe, a 2-2 cylindrical member being in close contact with the inner side of the case, and two or more second connecting portions connecting the 2-1 cylindrical member with the 2-2 cylindrical member.

8. The cooling-water heating type heater of claim 1, further comprising a temperature sensor,
wherein the controller is configured to control the operations of the first heating part and the second heating part, using the information sensed by the temperature sensor.

9. The cooling-water heating type heater of claim 8, wherein the temperature sensor is disposed close to the discharge port of the case.

10. The cooling-water heating type heater of claim 5, further comprising an anti-overheating part configured to shut off power supplied to the first heating part and the second heating part, when the cooling-water increases in temperature to a reference temperature or more.

11. The cooling-water heating type heater of claim 10, wherein a space forming a predetermined space on the second cover is formed on the outer side corresponding to the area where the second pipe is formed, and
the anti-overheating part is disposed in the space of the second cover.

12. The cooling-water heating type heater of claim 11, wherein the anti-overheating part includes:
a bimetal connected with a power line carrying power to the first heating part and the second heating part;
a bracket holding one end of the bimetal in the space of the second cover; and
a terminal carrying power from an external power to the heating layers through the bimetal, in contact with the other end of the bimetal,
wherein when the temperature of the second cover which corresponds to the temperature of cooling-water increases over the reference temperature, the bimetal deforms such that the other end of the bimetal comes off the terminal, such that the power supplied to the first heating part and the second heating part is shut off.

13. The cooling-water heating type heater of claim 1, wherein at least one of the first heating layer and the second heating layer is made of carbon nanotube.

14. The cooling-water heating type heater of claim 1, wherein the end of the first protection pipe is welded to the first pipe.

15. The cooling-water heating type heater of claim 1, wherein the end of the second protection pipe is welded to the second pipe.

16. The cooling-water heating type heater of claim 1, wherein the heater is configured to allow cooling-water flowing inside the case through the intake port to be discharged through the discharge port, sequentially through a first heating area where the cooling-water is heated while flowing through the first pipe, a second heating area where the cooling-water that has passed the first heating area and returned at the other end of the case is heated while flowing between the first pipe and the second pipe, and a third heating area where the cooling-water that has passed the second heating area and returned at the one end of the case is heated while flowing through between the second pipe and the case.

* * * * *